United States Patent
Nakamura et al.

(10) Patent No.: US 9,085,230 B2
(45) Date of Patent: Jul. 21, 2015

(54) SADDLE RIDE TYPE VEHICLE

(71) Applicant: HONDA MOTOR CO., LTD., Tokyo (JP)

(72) Inventors: Kenichiro Nakamura, Wako (JP); Shinichiro Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/156,545

(22) Filed: Jan. 16, 2014

(65) Prior Publication Data

US 2014/0209405 A1    Jul. 31, 2014

(30) Foreign Application Priority Data

Jan. 31, 2013    (JP) ................. 2013-017301

(51) Int. Cl.

| | |
|---|---|
| *B60K 13/04* | (2006.01) |
| *B60K 11/04* | (2006.01) |
| *B62K 11/04* | (2006.01) |
| *F02B 61/02* | (2006.01) |
| *F01N 1/00* | (2006.01) |

(52) U.S. Cl.
CPC .............. *B60K 11/04* (2013.01); *B60K 13/04* (2013.01); *B62K 11/04* (2013.01); *F01N 1/00* (2013.01); *F02B 61/02* (2013.01)

(58) Field of Classification Search
CPC ........ B60K 11/04; B62K 11/00; B62K 13/04; B62K 13/02
USPC ......... 180/229, 219, 311, 227, 225, 296, 309, 180/68.4
See application file for complete search history.

(56) References Cited

U.S. PATENT DOCUMENTS

| | | | | |
|---|---|---|---|---|
| 4,696,366 | A * | 9/1987 | Hattori ........................ | 180/296 |
| 4,881,614 | A * | 11/1989 | Hoshi et al. ................. | 180/225 |
| 5,251,582 | A * | 10/1993 | Mochizuki .................. | 123/73 A |
| 5,269,243 | A * | 12/1993 | Mochizuki .................. | 123/41.55 |
| 6,332,505 | B1 * | 12/2001 | Tateshima et al. ........... | 180/229 |
| 6,601,666 | B2 * | 8/2003 | Okuma et al. ............... | 180/227 |
| 6,640,921 | B2 * | 11/2003 | Okuma ........................ | 180/219 |
| 6,695,089 | B2 * | 2/2004 | Adachi et al. ............... | 180/311 |
| 8,146,693 | B2 * | 4/2012 | Oohashi et al. ............. | 180/68.3 |
| 8,393,433 | B2 * | 3/2013 | Inoue et al. .................. | 180/309 |
| 8,579,064 | B2 * | 11/2013 | Oohashi et al. ............. | 180/219 |
| 8,757,313 | B2 * | 6/2014 | Iwata et al. .................. | 180/229 |
| 2006/0065455 | A1 * | 3/2006 | Saiki et al. .................. | 180/68.4 |
| 2013/0118822 | A1 * | 5/2013 | Toda et al. ................... | 180/68.4 |

FOREIGN PATENT DOCUMENTS

JP    2938939 B2    8/1999

* cited by examiner

*Primary Examiner* — Hau Phan
(74) *Attorney, Agent, or Firm* — Birch, Stewart, Kolasch & Birch, LLP

(57) ABSTRACT

A motorcycle including a vehicle body frame with a single down frame extending downwardly and rearwardly from a head pipe supporting a front fork in a steerable manner. An engine main body arranged behind the down frame, said engine main body being mounted on the vehicle body frame. A pair of left and right radiators arranged separately on left and right sides of the down frame respectively, said pair of left and right radiators being supported on the vehicle body frame in front of the engine main body. Exhaust pipes connected to front portions of an engine main body with a down frame and a pair of left and right radiators being arranged side by side in a left-right direction wherein the exhaust pipes are located between at least one of the pair of left and right radiators and the down frame in a vehicle front view.

16 Claims, 3 Drawing Sheets

SADDLE RIDE TYPE VEHICLE

CROSS-REFERENCE TO RELATED APPLICATIONS

The present application claims priority under 35 USC 119 to Japanese Patent Application No. 2013-017301 filed Jan. 31, 2013 the entire contents of which are hereby incorporated by reference.

BACKGROUND OF THE INVENTION

1. Field of the Invention

The present invention relates to a saddle ride type vehicle wherein a vehicle body frame includes a head pipe supporting a front fork in a steerable manner. The front fork rotatably supports a front wheel with a single down frame extending downwardly and rearwardly from the head pipe. An engine main body, arranged behind the down frame, is mounted on the vehicle body frame with a pair of left and right radiators separately arranged on left and right sides of the down frame respectively being supported on the vehicle body frame in front of the engine main body.

2. Description of Background Art

A motorcycle is known wherein exhaust pipes connected to front portions of an ending main body are arranged to extend under a pair of left and right radiators arranged in front of the engine main body. See, for example, Japanese Patent No. 2938939.

However, in the motorcycle disclosed in Japanese Patent No. 2938939, as the connecting positions of the exhaust pipes to the engine main body become higher due to an increase in the displacement of the engine, the radiators, in some cases, are arranged closer to the vehicle front side in order to avoid interference with the exhaust pipes. In such a case, a movable range of the front wheel is narrowed.

SUMMARY AND OBJECTS OF THE INVENTION

The present invention was made in view of the foregoing circumstances. It is an object of an embodiment of the present invention to provide a saddle ride type vehicle that is capable of avoiding interference between an exhaust pipe and radiators without narrowing the movable range of a front wheel.

According to an embodiment of the present invention, a motorcycle includes a vehicle body frame with a head pipe supporting a front fork in a steerable manner. The front fork rotatably supports a front wheel with a single down frame extending downwardly and rearwardly from the head pipe. An engine main body, arranged behind the down frame, is mounted on the vehicle body frame with a pair of left and right radiators arranged separately on left and right sides of the down frame respectively being supported on the vehicle body frame in front of the engine main body. An exhaust pipe is connected to a front portion of the engine main body. The down frame and the pair of left and right radiators are arranged side by side in a left-right direction in such a manner that the exhaust pipe is located between at least one of the pair of left and right radiators and the down frame in a vehicle front view.

According to an embodiment of the present invention, the pair of left and right radiators is arranged such that a distance therebetween becomes wider toward a front side.

According to an embodiment of the present invention, the vehicle body frame includes a pair of lower frames connected to a lower end portion of the down frame and extending rearward while being separated into left and right sides with a connecting portion of the lower frames to the down frame being arranged at a lower level relative to a lower end portion of the pair of left and right radiators.

According to an embodiment of the present invention, a pair of the left and right exhaust pipes connected to front portions of the engine main body are arranged to extend through respective spaces between the pair of left and right radiators and the down frame while a distance between the two exhaust pipes becomes narrower toward an upper side.

According to an embodiment of the present invention, a thermostat is connected to one of the pair of left and right radiators. A water pump is connected to the other one of the pair of left and right radiators. The thermostat and the water pump are provided to the engine main body respectively on left and right sides in a vehicle width direction.

According to an embodiment of the present invention, a communication pipe through which the pair of left and right radiators communicate with each other is arranged to run behind the down frame.

According to an embodiment of the present invention, a relative position between the pair of left and right radiators and the down frame is set such that at least a part of the radiators overlaps the down frame in a vehicle side view.

According to an embodiment of the present invention, the exhaust pipe, the down frame, and the radiators are arranged side by side in the left-right direction in the vehicle front view. Thus, the radiators can be arranged closer to the engine main body in a vehicle front-rear direction, i.e., nearer the rear side. This makes it possible to avoid interference between the exhaust pipe and the radiators without narrowing the movable range of the front wheel and the front fork.

According to an embodiment of the present invention, since the pair of left and right radiators are arranged such that the distance therebetween becomes wider toward the front side, a wider movable range of the front wheel and the front fork can be obtained.

According to an embodiment of the present invention, the pair of lower frames extending rearwardly from the lower end portion of the down frame is connected to the down frame at the lower level than that of the lower end portion of the radiators. Thus, a space for arranging the exhaust pipe is secured between the pair of left and right radiators, and thereby the movable range of the front wheel and the front fork can be further obtained.

According to an embodiment of the present invention, the pair of left and right exhaust pipes whose distance becomes narrower toward the upper side is arranged to extend through the respective spaces between the pair of left and right radiators and the down frame. Thus, the two radiators existing outside the exhaust pipes in the vehicle width direction can be arranged nearer the center in the vehicle width direction. Accordingly, the saddle ride type vehicle can be made compact in the vehicle width direction.

According to an embodiment of the present invention, the thermostat and the water pump are provided to the engine main body respectively on the left and right sides in the vehicle width direction. The thermostat is connected to one of the radiators, and the water pump is connected to the other radiator. Thus, the channel tube members connecting the thermostat and the water pump to the pair of left and right radiators, respectively, can be routed respectively on the left and right sides of the engine main body. Moreover, the radiators can be arranged nearer the engine main body in the vehicle front-rear direction, i.e., nearer the rear side. Consequently, a much wider movable range of the front wheel and the front fork can be obtained.

According to an embodiment of the present invention, the pair of left and right radiators communicate with each other through the communication pipe running behind the down frame. Thus, an additional space is obtained in front of the down frame, and the movable range of the front wheel and the front fork can be further obtained.

According to an embodiment of the present invention, at least the part of the radiators overlaps the down frame in the vehicle side view. Consequently, the radiators, the exhaust pipes and the down frame can be arranged efficiently in a concentrated manner, which enables the movable range of the front wheel and the front fork to be further obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described with reference to accompanying FIGS. 1 to 3. In the following description, front, rear, left, right, upper and lower indicate directions are viewed from a passenger who rides on the motorcycle.

Figure 1:
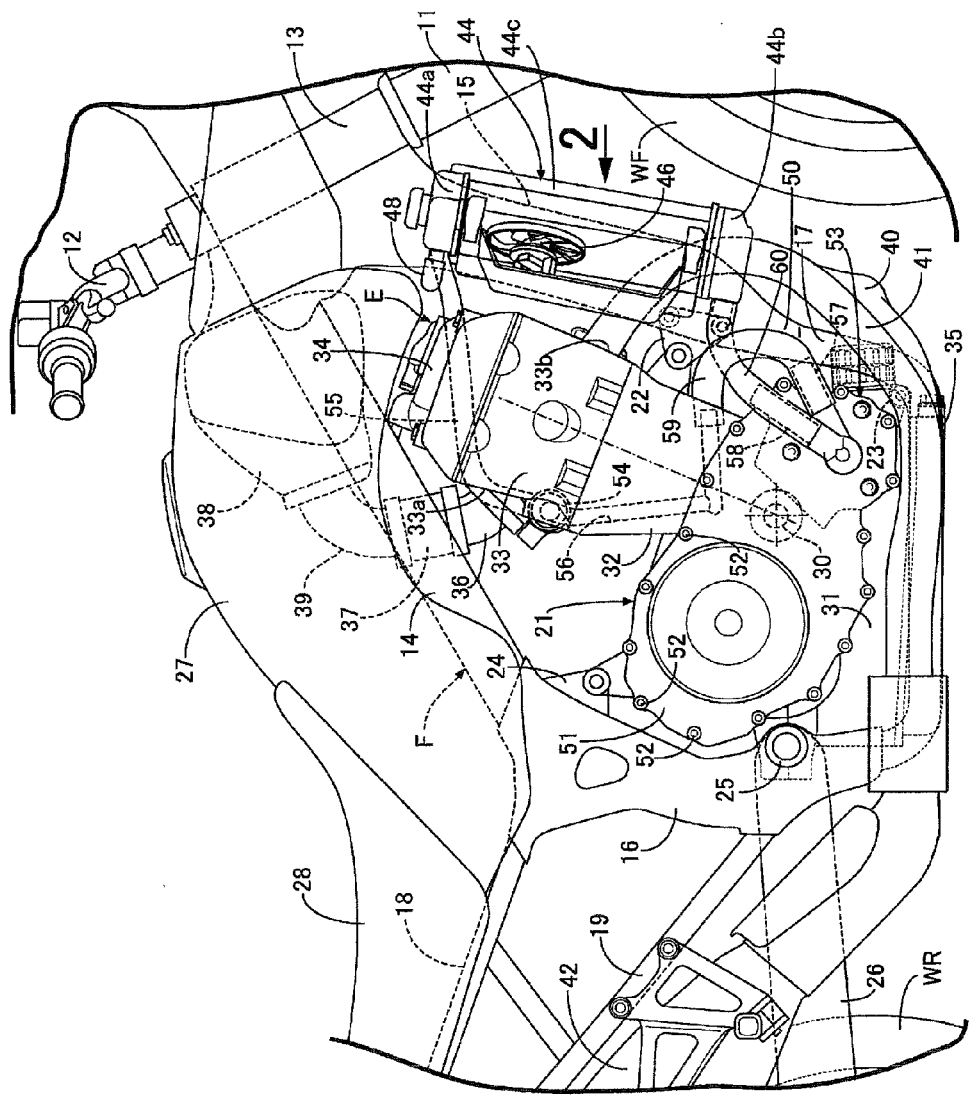
FIG. 1 is a right-side view illustrating a part of a motorcycle.
Figure 2:
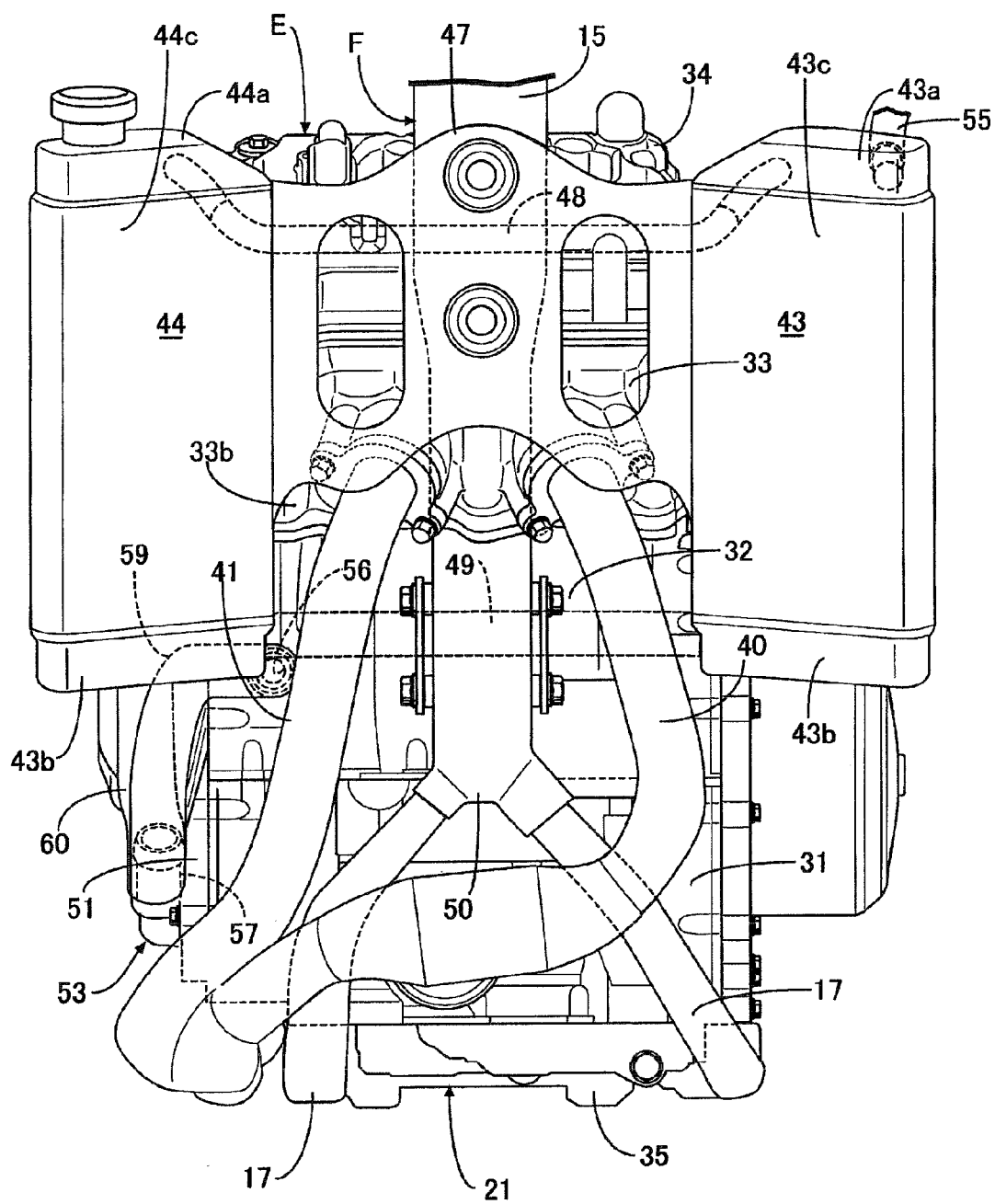
FIG. 2 is a view on arrow 2 in FIG. 1.

As illustrated in FIGS. 1 and 2, a vehicle body frame F of a motorcycle which is a saddle ride type vehicle includes a head pipe 13 supporting a front fork 11 and a bar-shaped steering handle bar 12 in a steerable manner. The front fork 11 rotatably supports a front wheel WF with a pair of left and right main frames 14 extending downwardly and rearwardly from the head pipe 13. A single down frame 15 extends downwardly and rearwardly from the head pipe 13 at a steeper angle than that of the main frames 14. A pair of left and right pivot frames 16 extends downwardly from rear end portions of the main frames 14. A pair of left and right lower frames 17 is connected to a lower end portion of the down frame 15, extending rearwardly while being separated into left and right sides, and connected to lower end portions of the pivot frames 16. A pair of left and right seat rails 18 extend upwardly and rearwardly from upper end portions of the pivot frames 16 with a pair of left and right rear frames 19 connecting middle portions of the pivot frames 16 to middle portions of the seat rails 18, respectively.

On the vehicle body frame F, an engine main body 21 of a water-cooled engine E is mounted in such a manner so as to be surrounded by the main frames 14, the down frame 15, the pivot frames 16, and the lower frames 17. The engine main body 21 is supported at mount brackets 22, 23, 24 that are provided to a lower portion of the down frame 15, front portions of the lower frames 17, and upper portions of the pivot frames 16, respectively. The engine main body 21 is also supported at lower portions of the pivot frames 16, via a support shaft 25. A front end portion of a swing arm 26 rotatably supporting a rear wheel WR at a rear end portion thereof is supported by the pivot frames 16 via the support shaft 25 in such a manner that the swing arm 26 can swing up and down.

A fuel tank 27 is supported on the main frames 14 in such a manner so as to cover the engine main body 21 from above. A passenger seat 28 arranged behind the fuel tank 27 is supported on the seat rails 18.

The engine main body 21 is configured as a two-cylinder inline engine and includes a crank case 31 rotatably supporting a crank shaft 30 extending in a vehicle width direction of the motorcycle. A cylinder block 32 is joined to a front portion of the crank case 31 with a cylinder head 33 being joined to an upper portion of the cylinder block 32. A head cover 34 is joined to the cylinder head 33. An oil pan 35 is joined to a lower end portion of the crank case 31.

Downstream ends of intake pipes 36 are connected to a rear-side wall 33a of the cylinder head 33, which is a rear part of the engine main body 21, corresponding to the respective cylinders. Downstream ends of throttle bodies 37 are connected to upstream ends of the intake pipes 36, respectively. In addition, an air cleaner 38 is arranged above the engine main body 21 in such a manner so as to be covered with the fuel tank 27 from above. Upstream ends of the throttle bodies 37 are connected to the air cleaner 38 through connecting tubes 39 provided for the respective throttle bodies 37.

Upstream ends of a pair of exhaust pipes 40, 41 provided for the respective cylinders individually are connected to a front-side wall 33b of the cylinder head 33 that is a front part of the engine main body 21. The exhaust pipes 40, 41 extend from the front side of the engine main body 21, run under the engine main body 21, and further extend rearwardly. Downstream ends of the exhaust pipes 40, 41 are both connected to an exhaust muffler 42 arranged on the right side of the rear wheel WR.

A pair of left and right radiators 43, 44 separated into two sides of the down frame 15 of the vehicle body frame F are arranged in front of the engine main body 21 in such a manner so as to be supported by the down frame 15. The radiators 43, 44 include cooling cores 43c, 44c between upper tanks 43a, 44a and lower tanks 43b, 44b with fans 45, 46 that are arranged on back surfaces of the cooling cores 43, 44, as illustrated in FIG. 3.

In addition, a relative position between the pair of left and right radiators 43, 44 and the down frame 15 is set such that at least a part of the radiators 43, 44 overlaps the down frame 15 in a vehicle side view.

Moreover, the upper tanks 43a, 44a of the two radiators 43, 44 communicate with each other through an upper communication pipe 48. The lower tanks 43b, 44b of the two radiators 43, 44 communicate with each other through a lower communication pipe 49. The upper and lower communication pipes 48, 49 are arranged to run behind the down frame 15, as illustrated in FIG. 3.

The exhaust pipes 40, 41 connected to the front-side wall 33b of the cylinder head 33 of the engine main body 21, the down frame 15, and the pair of left and right radiators 43, 44 are arranged side by side in a left-right direction in such a manner that the exhaust pipes 40, 41 are located between at least one of the pair of left and right radiators 43, 44 and the down frame 15 in a vehicle front view. In this embodiment, the exhaust pipes 40, 41, the down frame 15 and the radiators 43, 44 are arranged side by side in the left-right direction in the vehicle front view in such a manner that the pair of right and left exhaust pipes 40, 41 are located in respective spaces between the pair of left and right radiators 43, 44 and the down frame 15 in the vehicle front view. In addition, the pair of left and right exhaust pipes 40, 41 are arranged to extend through the respective spaces between the pair of left and right radiators 43, 44 and the down frame 15 while a distance between the exhaust pipes 40, 41 becomes narrower toward the upper side.

Figure 3:
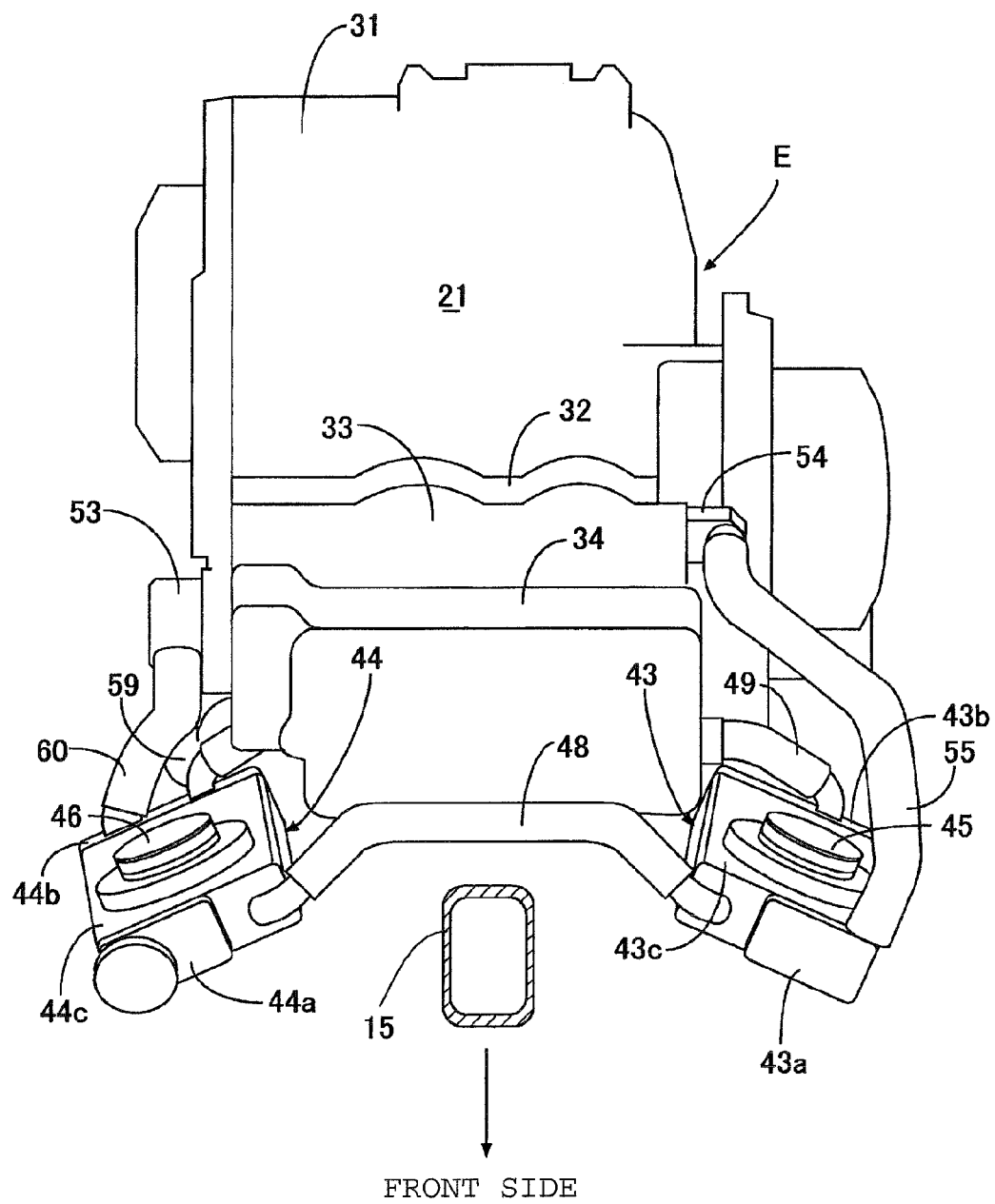
FIG. 3 is a cross sectional plan view illustrating a relative layout position between an engine main body, a down frame and left and right radiators.

In addition, the pair of left and right radiators 43, 44 are arranged such that a distance therebetween becomes wider toward the front side as illustrated in FIG. 3.

The vehicle body frame F includes the down frame 15 arranged in front of the engine main body 21 and the pair of lower frames 17, 17 connected to the lower end portion of the down frame 15 and extending rearwardly while being separated into the left and right sides. A connecting portion 50 of the lower frames 17, 17 to the down frame 15 is arranged at a lower level than that of a lower end portion of the pair of left and right radiators 43, 44.

A crank case cover 51 is attached to a right-side surface of the crank case 31 in the engine main body 21 with multiple bolts 52, 52. The crank case cover 51 covers the right-side surface and constitutes a part of the engine main body 21. A water pump 53 to supply cooling water to the cylinder block 32 and the cylinder head 33 of the engine main body 21 is provided to the crank case cover 51.

Meanwhile, a thermostat 54 is attached to a rear portion in a left-side surface of the cylinder head 33 in the engine main body 21, the thermostat 54 being capable of switching between a state where the cooling water let out from the cylinder head 33 is guided to the radiators 43, 44 and a state where the cooling water bypasses the radiators 43, 44. In other words, the water pump 53 and the thermostat 54 are provided to the engine main body 21 respectively on the right and left sides in the vehicle width direction.

The cooling water injected from the water pump 53 is guided to the cylinder block 32 of the engine main body 21. A channel tube member 55 and a bypass channel 56 are connected to the thermostat 54. The channel tube member 55 guides the cooling water from the cylinder head 33 toward the upper tank 43a of the left radiator 43 out of the two radiators 43, 44. The bypass channel 56 is for guiding the cooling water from the thermostat 54 to the water pump 53 in such a manner as to bypass the radiators 43, 44. The bypass channel 56 is formed inside the cylinder head 33 and the cylinder block 32 of the engine main body 21.

The water pump 53 includes a pair of suction pipes 57, 58. The bypass channel 56 is connected to the suction pipe 57 which is one of the suction pipes via a channel tube member 59 such as a hose, and the lower tank 44b of the right radiator 44 out of the two radiators 43, 44 is connected to the other suction pipe 58 via a channel tube member 60 such as a hose.

Next, effects of this embodiment are described. The vehicle body frame F includes the single down frame 15 extending downwardly and rearwardly from the head pipe 13. The engine main body 21 arranged behind the down frame 15 is mounted on the vehicle body frame F, while the pair of left and right radiators 43, 44 arranged separately on the left and right sides of the down frame 15 respectively are supported on the vehicle body frame F in front of the engine main body 21. The exhaust pipes 40, 41 connected to the front portions of the engine main body 21, the down frame 15 and the pair of left and right radiators 43, 44 are arranged side by side in the left-right direction in such a manner that the exhaust pipes 40, 41 are located between at least one of the pair of left and right radiators 43, 44 and the down frame 15 in the vehicle front view. Thus, the radiators 43, 44 can be arranged closer to the engine main body 21 in the vehicle front-rear direction, i.e., closer to the rear side. This makes it possible to avoid interference between the exhaust pipes 40, 41 and the radiators 43, 44 without narrowing the movable range of the front wheel WF and the front fork 11.

In addition, since the pair of left and right radiators 43, 44 are arranged such that the distance therebetween becomes wider toward the front side, a wider movable range of the front wheel WF and the front fork 11 can be secured.

The vehicle body frame F includes the pair of lower frames 17, 17 connected to the lower end portion of the down frame 15 and extending rearwardly while being separated into the left and right sides. The connecting portion 50 of the lower frames 17, 17 to the down frame 15 is arranged at the lower level than that of the lower end portion of the pair of left and right radiators 43, 44. Thus, a space for arranging the exhaust pipes 40, 41 is secured between the pair of left and right radiators 43, 44, and thereby the movable range of the front wheel WF and the front fork 11 can be further secured.

Moreover, the pair of left and right exhaust pipes 40, 41 connected to the front portions of the engine main body 21 are arranged to extend through the respective spaces between the pair of left and right radiators 43, 44 and the down frame 15 while the distance between the two exhaust pipes 40, 41 becomes narrower toward the upper side. Thus, the two radiators 43, 44 existing outside the exhaust pipes 40, 41 in the vehicle width direction can be arranged nearer the center in the vehicle width direction, and accordingly the motorcycle can be made compact in the vehicle width direction.

Further, the thermostat 54 connected to the one 43 of the pair of left and right radiators 43, 44 and the water pump 53 connected to the other one 44 of the pair of left and right radiators 43, 44 are provided to the engine main body 21 respectively on the left and right sides in the vehicle width direction. Thus, the channel tube members 55, 60 connecting the thermostat 54 and the water pump 53 to the pair of left and right radiators 43, 44, respectively, can be routed respectively on the left and right sides of the engine main body 21. Moreover, the radiators 43, 44 can be arranged nearer the engine main body 21 in the vehicle front-rear direction, i.e., nearer the rear side. Consequently, a much wider movable range of the front wheel WF and the front fork 11 can be secured.

In addition, the upper and lower communication pipes 48, 49 through which the pair of left and right radiators 43, 44 communicate with each other are arranged to run behind the down frame 15. Thus, an additional space is obtained in front of the down frame 15, and the movable range of the front wheel WF and the front fork 11 can be further secured.

Furthermore, the relative position between the pair of left and right radiators 43, 44 and the down frame 15 is set such that at least a part of the radiators 43, 44 overlaps the down frame 15 in the vehicle side view. Thus, the radia 43, 44, the exhaust pipes 40, 41 and the down frame 15 can be arranged efficiently in a concentrated manner, which enables the movable range of the front wheel WF and the front fork 11 to be further secured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle ride vehicle in which a vehicle body frame includes a head pipe supporting a front fork in a steerable manner, the front fork rotatably supporting a front wheel, and a single down frame extending downwardly and rearwardly from the head pipe wherein an engine main body is arranged behind the down frame and is mounted on the vehicle body frame and a pair of left and right radiators is arranged separately on left and right sides of the down frame respectively and is supported on the vehicle body frame in front of the engine main body, and a pair of left and right exhaust pipes connected to front portions of the engine main body, so that when viewed in a front view, the left radiator, the left exhaust pipe, the down frame, the right exhaust pipe, and the right radiator can be seen as being arranged side by side in a left-right direction, wherein each of the pair of the left and right exhaust pipes is arranged to extend through respective spaces between the pair of left and right radiators and the down frame while a distance between the two exhaust pipes becomes narrower toward an upper side.

2. The saddle ride vehicle according to claim 1, wherein the pair of left and right radiators is arranged such that a distance therebetween becomes wider toward a front side.

3. The saddle ride vehicle according to claim 2, wherein a thermostat connected to one of the pair of left and right radiators and a water pump connected to the other one of the pair of left and right radiators are provided to the engine main body respectively on left and right sides in a vehicle width direction.

4. The saddle ride vehicle according to claim 2, wherein a communication pipe through which the pair of left and right radiators communicates with each other is arranged to run behind the down frame.

5. The saddle ride vehicle according to claim 2, wherein a relative position between the pair of left and right radiators and the down frame is set such that at least a part of the radiators overlaps the down frame in a vehicle side view.

6. The saddle ride vehicle according to claim 1, wherein the vehicle body frame includes a pair of lower frames connected to a lower end portion of the down frame and extending rearwardly while being separated into left and right sides, and a connecting portion of the lower frames to the down frame is arranged at a lower level than that of a lower end portion of the pair of left and right radiators.

7. The saddle ride vehicle according to claim 6, wherein a thermostat connected to one of the pair of left and right radiators and a water pump connected to the other one of the pair of left and right radiators are provided to the engine main body respectively on left and right sides in a vehicle width direction.

8. The saddle ride vehicle according to claim 6, wherein a communication pipe through which the pair of left and right radiators communicates with each other is arranged to run behind the down frame.

9. The saddle ride vehicle according to claim 6, wherein a relative position between the pair of left and right radiators and the down frame is set such that at least a part of the radiators overlaps the down frame in a vehicle side view.

10. The saddle ride vehicle according to claim 2, wherein the vehicle body frame includes a pair of lower frames connected to a lower end portion of the down frame and extending rearwardly while being separated into left and right sides, and a connecting portion of the lower frames to the down frame is arranged at a lower level than that of a lower end portion of the pair of left and right radiators.

11. The saddle ride vehicle according to claim 1, wherein a thermostat connected to one of the pair of left and right radiators and a water pump connected to the other one of the pair of left and right radiators are provided to the engine main body respectively on left and right sides in a vehicle width direction.

12. The saddle ride vehicle according to claim 1, wherein a communication pipe through which the pair of left and right radiators communicates with each other is arranged to run behind the down frame.

13. The saddle ride vehicle according to claim 1, wherein a relative position between the pair of left and right radiators and the down frame is set such that at least a part of the radiators overlaps the down frame in a vehicle side view.

14. A saddle ride vehicle comprising:

a vehicle body frame including a head pipe supporting a front fork in a steerable manner;

a front wheel rotatably supported by the front fork;

a single down frame extending downwardly and rearwardly from the head pipe;

an engine main body arranged behind the down frame, said engine main body being mounted on the vehicle body frame;

a pair of left and right radiators arranged separately on left and right sides of the down frame respectively, said pair of left and right radiators being supported on the vehicle body frame in front of the engine main body; and a pair of left and right exhaust pipes connected to front portions of the engine main body, so that when viewed in a front view, the left radiator, the left exhaust pipe, the down frame, the right exhaust pipe, and the right radiator can be seen as being arranged side by side in a left-right direction, wherein each of the pair of the left and right exhaust pipes is arranged to extend through respective spaces between the pair of left and right radiators and the down frame while a distance between the two exhaust pipes becomes narrower toward an upper side.

15. The saddle ride vehicle according to claim 14, wherein the pair of left and right radiators is arranged such that a distance therebetween becomes wider toward a front side.

16. The saddle ride vehicle according to claim 14, wherein:

the vehicle body frame includes a pair of lower frames connected to a lower end portion of the down frame and extending rearwardly while being separated into left and right sides, and a connecting portion of the lower frames to the down frame is arranged at a lower level than that of a lower end portion of the pair of left and right radiators.

* * * * *